Patented Apr. 22, 1947

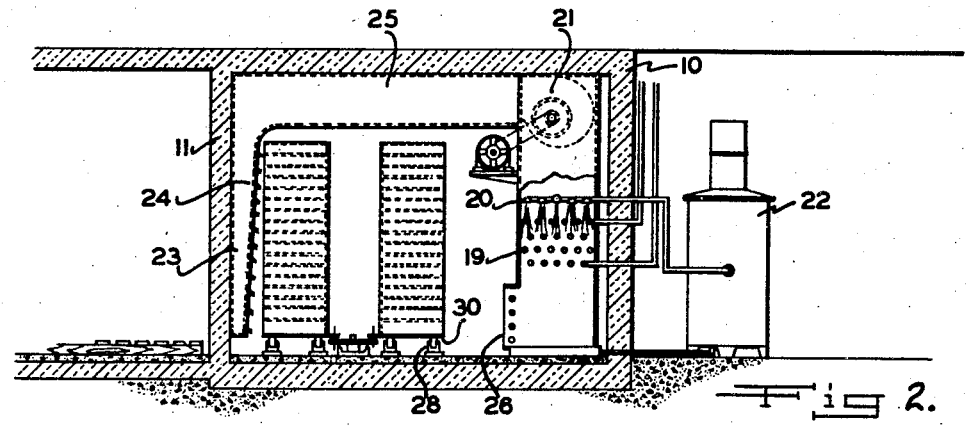
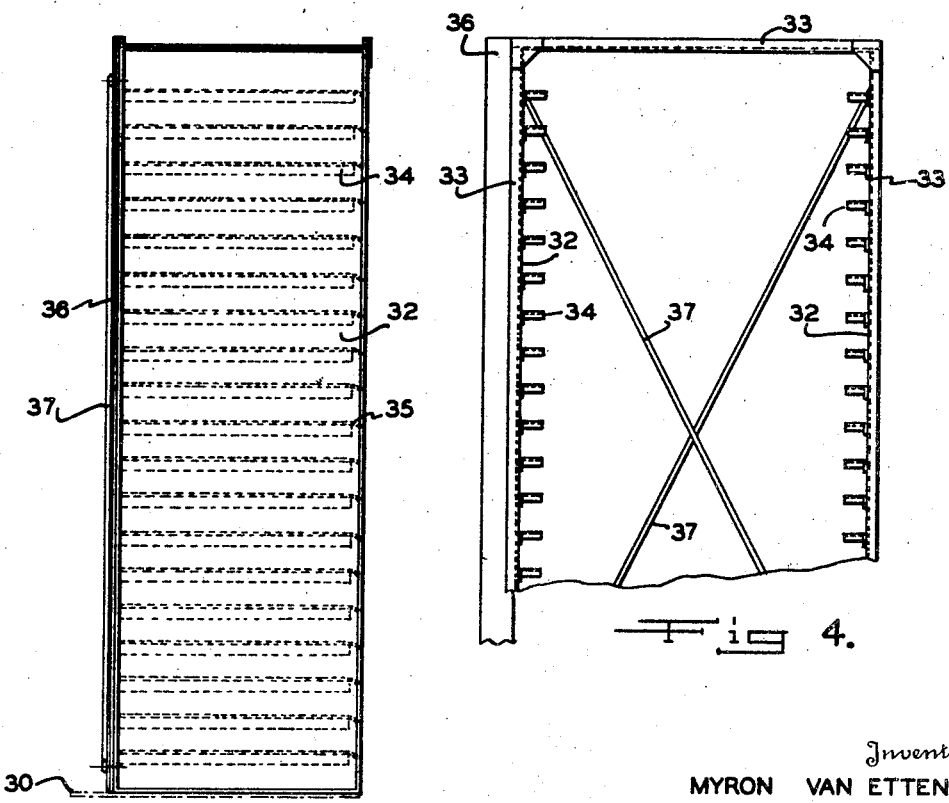

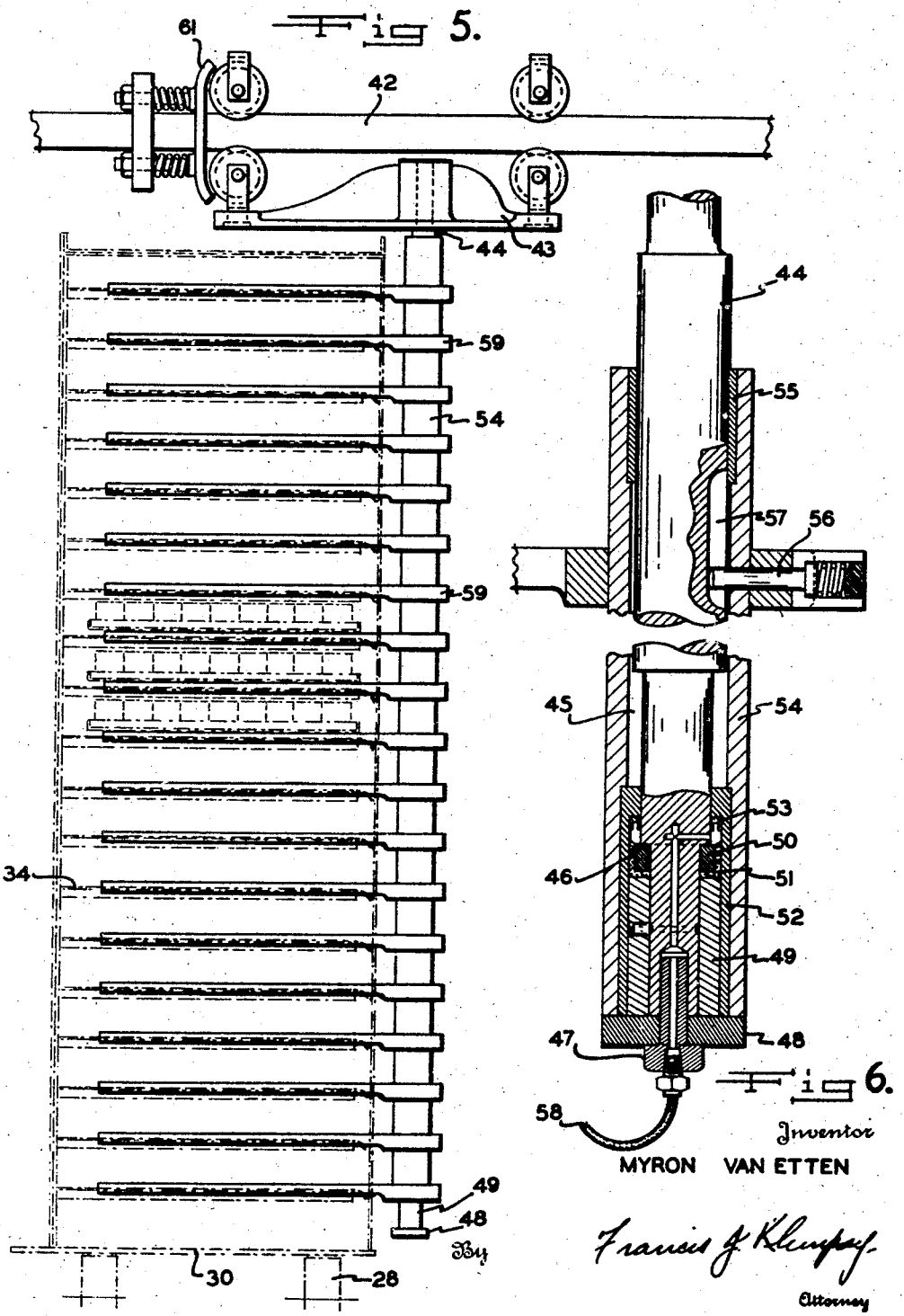

2,419,380

UNITED STATES PATENT OFFICE 2,419,380

FREEZING OF FOODS

Myron Van Etten, Salem, Ohio, assignor to The Salem Engineering Company, Salem, Ohio, a proprietorship Application October 8, 1945, Serial No. 620,943

7 Claims. (Cl. 62—102)

This invention relates to the freezing of foods and more particularly to improved methods and apparatus for accomplishing this function and for effecting the necessary handling of the foods in connection with the freezing process.

The advantages of quick freezing of foods as regards the retardation of ice crystallization, of salt diffusion, of bacterial growth, and of change in cellular structure are now well known and a number of specific methods for very rapidly extracting heat from foodstuffs have been proposed. These methods may be divided into three general categories—direct contact with brine or other refrigerating medium, direct contact with a heat conductive baffle chilled by the refrigerating medium, and freezing in a blast of chilled air. The first method is of limited applicability while the second requires quite complicated and/or extensive apparatus for commercial rates of production so that the air blast method is the one most generally accepted. However, the systems heretofore proposed for quick freezing by the latter method entailed poor over-all efficiency and difficulty in maintaining the air in the freezing chamber at the desired low temperature. Either the freezing chamber is intermittently opened for partial unloading and loading in which case there is a more or less continuous loss of refrigerated air or the chamber is loaded to capacity in one operation in which case the compressor is overloaded in attempting to maintain the required low temperatures. It is accordingly one of the primary objects of the invention to provide improved methods and apparatus for quickly freezing foods, in commercial quantities, by the chilled air blast principle whereby the efficiency of the freezing plant as a whole is materially increased. The invention accomplishes this object while yet providing a practical arrangement for loading and unloading the freezing chamber and in a representative embodiment of the invention the accomplishment of the object results from the employment of an arrangement whereby the freezing chamber proper is always substantially sealed against the egress or ingress of air and whereby but one of a number of tray racks or supports is ejected from the chamber at any one time for unloading of the frozen product and loading of the unfrozen product.

Another of the more important objects of the invention is the provision in a chilled air blast type of food freezing system of an improved and simplified arrangement of interrelating the food and air streams whereby a maximum rate of heat exchange may be effected to thereby freeze large commercial quantities of food to low temperatures in a short period of time. This involves the stratification of the air flow to insure efficient distribution of the same and a counterflow arrangement to insure a fairly uniform distribution of temperature gradients thus effecting a maximum over-all rate of heat transfer.

Another item of importance in the processing and freezing of foods, particularly fruits and vegetables, is the starting of the freezing operation within the smallest possible period of time following the peeling and other preparation of the food articles so as to minimize decomposition and consequent discoloration. In a plant having a more or less continuous preparing line it is desirable that the finished product be charged into the freezer in a substantially continuous manner. It is therefore another of the primary objects of the invention to provide improved methods and apparatus for quick freezing foods by the chilled air blast principle which methods and apparatus are amenable to rapid intermittent charging without appreciable loss of the deeply chilled air and without interfering with the continuation of the freezing action in the freezing chamber. This is accomplished in accordance with the preferred embodiment of the invention by arranging the food, either packaged or in bulk, on light metallic trays and simultaneously loading a multiplicity of such filled trays on one of a number of individual supports or racks which move about in the freezing chamber on a conveyor system which ejects only a single support or rack from the chamber at one time for loading and unloading. It should be observed, further, that this arrangement is also of advantage as regards over-all efficiency of operation since the individual racks are not out of the freezing chamber a sufficient length of time to pick up much heat and consequently the only heat which must be extracted in the chamber comes from the food and the trays. By constructing the latter of very thin material the total heat carried by the metal is small in proportion to the heat carried by the food and the load on the refrigerating system is accordingly diminished.

A further object of the invention is the provision of an improved food freezing system of the chilled air blast type whereby the freezing chamber and circulating air therein may readily be continuously maintained at effective processing temperatures so that the system may be kept in operation over long periods of time, as for the duration of a harvest season for example, without being shut down for reconditioning of the cooling system. Another advantage sought and provided by the invention is the economical maintaining of the air in the freezing chamber at effective processing temperature when the freezing load is reduced or withdrawn so that economic "stand-by" losses in plants of this character may be reduced.

A still further object of the invention is the provision of improved means to support either bulk or packaged food in a chilled air blast freezing chamber and of improved means to charge and discharge the food into and out of the chamber.

The above and other objects and advantages of the invention will become apparent upon consideration of the following detailed specification and the accompanying drawing wherein there is disclosed a preferred embodiment of the invention.

In the drawing:

Figure 2 is a transverse section through the apparatus of Figure 1;

Figures 3 and 4 are side and front elevational views, respectively, of one of the tray racks utilized in the assembly of Figure 1;

Figure 5 is a side elevation illustrating the loading of trays on one of the racks by means of the tray handling device of the invention; and Figure 6 is a longitudinal section through the lifting column of the tray handling device of the invention.

Figure 1:
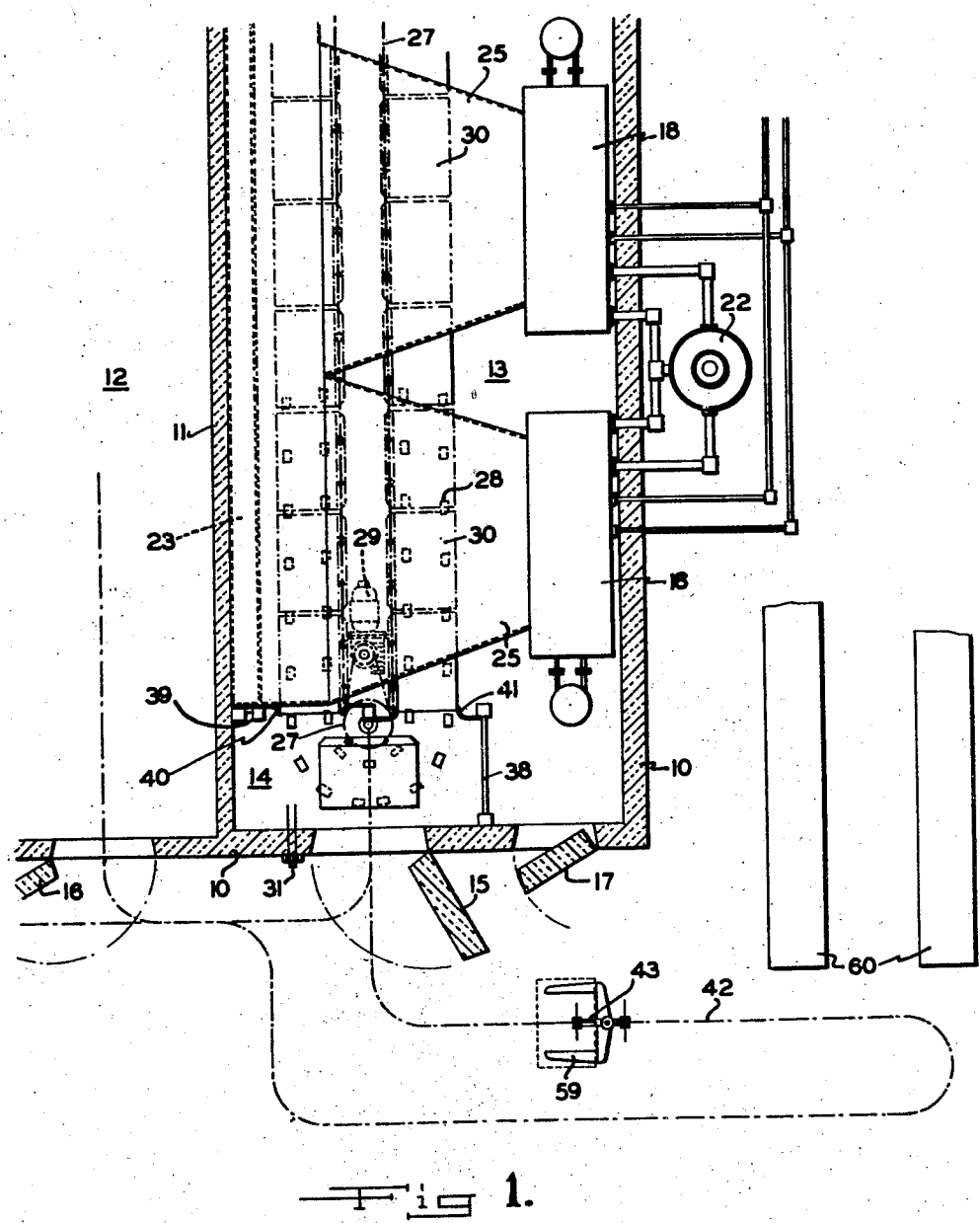
Figure 1 is a partial plan view of the food freezing plant constructed in accordance with the principles of the invention.

In carrying out my invention I construct a refrigerated enclosure having outer insulated side walls 10 and a partition wall 11 dividing the enclosure into two principal rooms—the room 12 for frozen food storage and the room 13 for rapid or deep freezing. Thus, the room 13 will normally be maintained at a much lower temperature than the room 12 and this increased refrigeration will result from the blasts of deeply chilled air which are utilized, in a manner to be hereinafter more fully explained, in the freezing of the food placed in the room 13. Room 13 is provided with a vestibule 14, the purpose of which will be described in detail below, and with an outer entrance door 15. A door 16 provides access to the space 12 and a third door 17 provides access to the space 13 in bypassing relation to the vestibule 14.

Extending along the outer wall of the space 13 is a number of air cooling and air moving assemblies 18 each having refrigerant evaporating coils 19, a spray head 20 for directing a defrosting liquid onto the coils 19, and a blower 21 for rapidly moving large volumes of air over the coils 19. The fluid employed at the spray heads 20 has such hygroscopic and low freezing point characteristics that it is operative to prevent the formation of frost on the coils 19 and as this liquid is recirculated continuously I provide a concentrator 22 which operates to take out the water as the same is picked up by the liquid during its passage over the coils 19.

Extending downwardly along the opposite wall of space 13 is a continuous distributing duct 23 having a multiplicity of vertical spaced but longitudinally extending slit openings 24 through which the chilled air coming into the duct 23 under pressure may be ejected horizontally. The upper portion of duct 23 is connected with a pair of horizontal ducts 25 leading from the outlets of blowers 21 and extending transversely across the roof of the space 13 as shown. To complete the recirculatory path of the freezing air I provide longitudinally extending inlets 26 along the bottom of each of the air cooling units 18.

Extending longitudinally in the chamber 13 intermediate the assemblies 18 and the duct 23 is an endless chain conveyor comprised of the chain 27 and outwardly spaced supporting rollers 28. This conveyor may be of the kind shown in detail in U. S. Patent No. 2,342,468 but is preferably of the type shown in detail in the co-pending application of Hubert Schebler, Serial No. 475,805, filed February 13, 1943. As such, the endless chain is entrained over a pair of spaced horizontally disposed sprockets one of which is driven by a motor 29. Connected to this chain along their inner side edges are a plurality of adjacent plates 20 which are supported on the rollers 28 during their travel about the orbital path provided. A suitable indexing control, which may be similar to that shown and described in said copending application, may be provided for the motor 29 and a control switch 31 may be placed in close proximity to the door 15 so that upon each actuation of the switch 31 the motor 29 will operate to bring the next succeeding support or plate 20 into position in front of the door 15 as will be understood. It is also within the contemplation of the invention that the control switch may be actuated automatically upon closing of the door 15 so that upon closing of this door the conveyor will be actuated and indexed to bring the next succeeding support or plate before the door.

Referring now to Figures 2, 3 and 4, it will be observed that each of the plates 30 supports a rack for retaining a plurality of food holding trays in superimposed vertically spaced relation. Such racks are each comprised of vertically extending side plates 32 tied together with a top plate 33 and having outwardly extending flanges 33 along their rear edges. Welded or otherwise rigidly secured to the inner faces of the side plates 32 are cleats 34 to receive the side edge portions of the food trays as will be understood. To assist in guiding the trays into the racks the cleats 34 are curved downwardly at their front end portions as shown at 35. Secured to the flange 33 of the left side plate of each of the rack units is a strip 36 of flexible fabric, preferably of vulcanized rubber, and having their ends rigidly secured to the flanges 33 of both the side plates 32 is a pair of diagonal braces 37.

Vestibule 14 has a side wall 38 and rear wall 39 formed with openings 40 to allow passage of the racks during operation of the conveyor. Extending about the edges of the openings 40 are flexible leaves 41 which press against the racks and which, in cooperation with the solid side plates or panels 32 of the racks form an effective barrier between the vestibule 14 and the space 13. In this manner the ingress and egress of air into and out of the freezing chamber 13 during the loading and unloading of the racks is kept to an absolute minimum. The indexing mechanism of the control for the driving motor 29 is so adjusted that the conveyor stops when the side plates or panels of two of the racks are wedged in the flaps 41 of the openings 40.

To further reduce the refrigeration losses and to speed up the loading and unloading of the racks on the conveyor whereby the freezing plant will operate at optimum efficiency and rate of production I provide the charging and discharging mechanism now to be described. An elevated mono-rail 42 (Figures 1, 5) is incorporated in the plant, preferably having the lay-out shown schematically in Figure 1 wherein reaches of the same extend into the room 12 and into the vestibule 14. Rail 42 movably supports a wheeled truck 43 rigidly mounting a downwardly extending post 44. The lower end portion of the post 44 is shouldered at 45 and is further necked inwardly at 46. A cap screw 47 clamps a disc 48 to the lower end of post 44 and interposed between this disc and shoulder 56 is a sleeve 49 and a ring 50 clamping between them a cupped packing 51. Slidably mounted on the sleeve 49 and packing 51 is a second sleeve 52 which is reduced in internal diameter at its upper end portion to closely fit the post 44 above the shoulder 46. A U-shaped packing 53 is inserted against the internal shoulder of the sleeve 52 so that upon the application of fluid pressure to the annular space intermediate the packings 51 and 53 the sleeve 52 will be elevated with respect to the post 44. A tube 54 is slid over the post 44 and has its lower end portion enlarged in internal diameter to partially receive the sleeve 52. Thus, upon upper movement of sleeve 52 the tube 54 will also be moved upwardly. The upper end of tube 54 is guided concentrically by a bushing 55 and 54 is free to rotate about post 44 and to have vertical movement with respect thereto but, if desired, the extent of such rotation and movement may be limited by a spring pressed plunger 56 engaging a recess 57 formed in the side wall of post 44. Fluid under pressure, preferably hydraulic fluid, may be supplied by a flexible conduit 58 connected with bores formed in screw 47 and in the lower end portion of post 44 and leading to the annular space aforesaid. A suitable foot valve or hand valve, not shown, is employed to control the flow of fluid pressure to the lifting unit.

As shown in Figures 1 and 5, a plurality of forks 59 are secured to the tube 54 in uniform vertically spaced relation and, in practice, this spacing is identical with the spacing of cleats 34 on the rack units previously described. Each of the forks 59 is adapted to support one of the food holding trays, which trays may be, in accordance with usual practice, simply upwardly lipped panels formed of light gauge aluminum or other metal sheets. Such trays may be loaded either with bulk or packaged foods and placed on the forks 59 at a loading station shown schematically at 60 in Figure 1. The car 43 carrying the forks and trays might now be moved into vestibule 14 and assuming that an empty rack is in the vestibule the trays on the forks 59 may be simultaneously charged into such rack. For this purpose fluid pressure is admitted into the lifting mechanism to raise the tube 54 and the trays carried thereby so that the side edges of the trays will enter freely between the cleats 34. Upon the trays being properly positioned horizontally the fluid pressure is released and the forks moved downwardly free of trays while the side edge portions of the trays rest on the cleats as will be understood. To limit the inward movement of the tray conveyor whereby the trays will be automatically supported in proper position relative to the racks I provide a resilient stop or bumping member as shown at 61 in Figure 5.

In operating the plant above described, refrigerant from a suitable compressor, not shown, is supplied to the coils 19 while suitable frost preventing fluid is pumped to the spray heads 20. The blowers 21 are in continuous operation. The racks formed by the vertical plates 32 are now loaded in succession in the manner outlined above and it will be understood that the racks will move longitudinally through the freezing chamber first past the air coolers 18 and thence past the outlets in the duct 23. In this manner the coldest air impinges against the food the freezing of which is almost completed so that effective temperature gradients are maintained at both the freshly charged and frozen load components thereby insuring a high rate of total heat extraction. When loaded racks begin to come into the vestibule 14 the same are quickly unloaded of their trays by the charging device above described and quickly reloaded with fresh food before the conveyor is again actuated to bring the next succeeding rack before the door 15.

It should be noted that the open nature of the tray supporting racks allows free passage of air (issuing from the outlets 24 in the duct 23) over and about the trays supported on the racks—the plates 32 making up the racks being positioned parallel with the direction of air flow when in the freezing chamber. The horizontally disposed trays and the vertically disposed plates 32 form, in effect, a deep grid, thereby insuring stratified flow of the chilled air blast and consequently effective distribution of the heat pick-up by the blast.

It should now be apparent that I have provided improved methods and apparatus for freezing foods by the chilled air blast principle which accomplishes the objects initially set out. Extraneous heat pick-up is reduced to a minimum even though the apparatus is simple in construction and operation and capable of processing very large commercial quantities of foods. Likewise, "stand-by" losses are reduced—making the method and apparatus practical for intermittent operation. By providing for the counter-flow of the food and chilled air stream and for the division of the stream between all the food trays in the freezing chamber a high operational efficiency results. Also, the closed and relatively small freezing chamber further reduces the refrigerating load.

The methods and apparatus herein proposed are adaptable to many products, including the hardening of ice cream, whether the products be packaged or in bulk and this flexibility is of extreme advantage in many instances.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. Apparatus for the quick freezing of foods comprising in combination a freezing chamber and means to circulate therein a chilled quantity of air, an endless conveyor in said chamber having a loop extending outside said chamber for moving and supporting a plurality of tray-supporting racks each adapted to support a multiplicity of food-carrying trays, a pair of adjacent openings in a wall of said chamber through which the conveyor passes and which permits egress and ingress of said racks whereby at least one of said racks may be moved to a loading position outside said chamber during a period of movement of said conveyor, and means to automatically seal said openings against ingress or egress of air when said one of said racks is in said loading position.

2. Apparatus according to claim 1 further characterized in that said conveyor comprises a plurality of supports each mounting one of said racks and movable in a horizontal plane along an oval path of travel, said means to circulate being operative to direct the chilled air laterally across the principal direction of movement of said racks, and each of said racks being laterally open to allow free passage therethrough of said chilled air.

3. Apparatus for the quick freezing of foods comprising in combination an elongated freezing chamber having air cooling and air moving means extending longitudinally along one side wall of said chamber, said means having a longitudinally extending air inlet positioned toward the bottom thereof and a longitudinally extended air outlet in the top thereof, an air distributing duct positioned along the opposite side wall of said chamber and having a plurality of vertically spaced but longitudinally extending slit openings to direct chilled air transversely across said chamber, overhead duct means interconnecting said outlet and said distributing duct, a rack mounted for movement longitudinally in said chamber and adapted to support a plurality of vertically spaced food carrying trays, a conveyor to move said rack through said chamber along a path extending first parallel with and adjacent to said moving means and thence in an opposite direction parallel with and adjacent to said distributing duct.

4. Apparatus for the quick freezing of foods comprising in combination an elongated freezing chamber having air cooling and air moving means extending longitudinally along one side wall of said chamber, said means having a longitudinally extending air inlet positioned toward the bottom thereof and a longitudinally extending air outlet in the top thereof whereby the air discharged by said means may travel laterally across the upper portion of said chamber, means extending along the opposite side wall of said chamber to direct said discharge air flow downwardly along said opposite side wall, a conveyor positioned in said chamber below the path of flow of said discharge air across the upper portion of said chamber and having a pair of straight portions disposed in side-by-side relation intermediate said side walls and substantially parallel thereto and having a return bend at one end of said straight portions, and a plurality of vertically disposed open-sided racks mounted on said conveyor and each supporting a plurality of horizontally disposed but vertically spaced food-carrying trays.

5. Apparatus for the quick freezing of food comprising in combination a freezing chamber, an air circulating means within said chamber for directing a wide stream of refrigerated air in a path across the upper portion of said chamber, means for deflecting said stream downwardly along a side wall of said chamber, said circulating means comprising means to draw said stream across the lower portion of said chamber, a conveyor positioned in said chamber below the path of flow of said air across the upper portion of said chamber and having a pair of straight portions disposed in side-by-side relation substantially parallel to said wall and having a return bend at one end of said straight portions, a plurality of vertically disposed open-sided racks mounted on said conveyor and each having a plurality of horizontally disposed but vertically spaced tray-supporting shelves therein, and a separable food retaining tray slideably received in each of said shelves.

6. Apparatus for the quick freezing of foods comprising in combination an insulated enclosure having a freezing chamber and a vestibule therein, means to circulate chilled air in said freezing chamber, an endless conveyor positioned principally in said chamber but having a portion extending out into said vestibule, a plurality of tray-supporting racks carried by said conveyor and each adapted to support a multiplicity of horizontally disposed but vertically spaced food carrying trays, a pair of adjacent openings in the wall between said vestibule and said chamber through which the conveyor passes and which permits egress and ingress of said racks, means to seal said openings against ingress or egress of air, a door in an outer wall of said vestibule having a width and height complementary to a cross-sectional area of one of said racks whereby a full rack charge of food to be frozen may be passed into said vestibule and then into said freezing chamber as a unit.

7. Apparatus for the quick freezing of foods comprising in combination a freezing chamber and means to circulate therein a chilled quantity of air, an endless conveyor in said chamber having a loop extending outside said chamber for moving and supporting a plurality of tray supporting racks each adapted to support a multiplicity of food-carrying trays, a plurality of tray-supporting racks on said conveyor and each having at least one solid vertically extending panel member, a pair of adjacent openings in a wall of said chamber through which the conveyor passes and which permits egress and ingress of said racks whereby said racks may be moved in succession to a loading position outside said chamber, said openings being generally complementary in size and shape with said panel members and said racks being so spaced on said conveyor that the panel members of two of said racks are positioned in said openings to form barriers against the passage of air through said openings when said conveyor is stopped in proper position.

MYRON VAN ETTEN.

REFERENCES CITED

The following references are of record in the file of this patent:

UNITED STATES PATENTS

| Number | Name | Date |
|---|---|---|
| 1,473,305 | Luce | Nov. 6, 1923 |
| 1,955,668 | Botz | Apr. 17, 1934 |
| 1,955,669 | Botz | Apr. 17, 1934 |
| 1,958,890 | Foss | May 15, 1934 |
| 1,969,833 | Beard | Aug. 14, 1934 |
| 2,041,443 | Sundbach | May 19, 1936 |
| 2,077,608 | Wood | Apr. 20, 1937 |
| 2,149,990 | Cook | Mar. 7, 1939 |
| 2,237,257 | Finnegan | Apr. 1, 1941 |
| 2,265,858 | Reynoldson | Dec. 9, 1941 |
| 2,277,382 | Botz | Mar. 24, 1942 |
| 2,385,140 | Knowles | Sept. 18, 1945 |